United States Patent [19]
Kroeker

[11] 3,989,224
[45] Nov. 2, 1976

[54] SLIDING GATE ASSEMBLY FOR IRRIGATION PIPES

[75] Inventor: Gerald H. Kroeker, Henderson, Nebr.

[73] Assignee: Epkro Plastics, Inc., Henderson, Nebr.

[22] Filed: July 14, 1975

[21] Appl. No.: 595,710

[52] U.S. Cl. .............................................. 251/145
[51] Int. Cl.² ........................................... F16K 3/28
[58] Field of Search ................................... 251/145

[56] References Cited
UNITED STATES PATENTS

| | | | |
|---|---|---|---|
| 3,327,990 | 6/1967 | Hohnstein | 251/145 |
| 3,455,533 | 7/1969 | Epp | 251/145 |
| 3,539,149 | 11/1970 | Se Breny | 251/145 |
| 3,598,362 | 8/1971 | Heidemann | 251/145 |

Primary Examiner—William R. Cline
Attorney, Agent, or Firm—Lowe, Kokjer, Kircher, Wharton & Bowman

[57] ABSTRACT

A sliding gate for controlling the outlet flow through an opening formed in the wall of an irrigation pipe. A sealing boot and connected carrier are positioned within the pipe with a pair of resilient walls projecting outwardly from the carrier through the pipe opening. A slide member which overlies the opening is provided with a cavity in which a pair of abutments are located. Shoulders formed on the resilient walls are engaged against the abutments in a snap fit to connect the gate components together for movement in unison.

6 Claims, 4 Drawing Figures

SLIDING GATE ASSEMBLY FOR IRRIGATION PIPES

BACKGROUND AND SUMMARY OF THE INVENTION

This invention relates generally to a valve for irrigation pipe and more particularly to an improved sliding gate assembly for controlling the flow through an outlet opening formed in the pipe.

Although sliding gate valves of the general type shown in U.S. Pat. No. 2,918,251 have achieved considerable popularity, they have not been wholly free of difficulties. Such gates are typically assembled by connecting the interior sealing boot to the exterior slide member by a screw which extends through the pipe opening. The assembly and disassembly of the screw connected gates involves a cumbersome and time consuming procedure, and it is also necessary to loosen and retighten the screw each time the gate is to be moved.

Due to the problems associated with screw connected gates, efforts have been made to develop gate devices that are more easily assembled and disassembled, such as those disclosed in U.S. Pat. Nos. 3,327,990 and 3,539,149. However, the assembly, and particularly the disassembly, of these snap together gates has not proven to be significantly easier than in the case of the screw connected gates. Furthermore, existing gates that are constructed for snap together assembly include only a single pair of connecting elements which hold the sealing boot and slide member together, and this single connection is often inadequate to maintain the entire surface area of the boot against the pipe. The seal is most susceptible to failure near the opposite ends of the boot because of the tendency in the prior art to establish the connection in a direction transversely of the boot. Consequently, it is not common for substantial water leakage to occur, particularly under conditions of high water pressure.

It is an object of the present invention to provide an improved sliding gate valve for an irrigation pipe which may be assembled and disassembled more easily than existing gates.

An additional object of the invention is to provide a sliding gate assembly which effects a sufficiently tight seal entirely around the pipe opening to prevent any water leakage, even under high pressure operation. This result is due primarily to the unique construction of the connecting elements which establish a connection that extends longitudinally for a substantial distance on opposite sides of the center line of the boot, thereby holding both ends and both sides of the boot tightly against the interior surface of the pipe.

A further object of the invention is to provide a sliding gate in which the connecting elements are shielded against exposure and yet are readily accessible to permit disassembly.

Another object of the invention is to provide a sliding gate assembly that is installed on the irrigation pipe in a manner to permit smooth and easy movement between its open and closed positions.

A still further object of the invention is to provide a sliding gate in which rotation of the gate components relative to one another and to the pipe is prevented.

Yet another object of the invention is to provide a sliding gate assembly which can be mass produced at a low cost and which is constructed of corrosion resistant materials.

DETAILED DESCRIPTION OF THE INVENTION

In the accompanying drawings, which form a part of the specification and are to be read in conjunction therewith, and in which like reference numerals indicate like parts in the various views.

Figure 1:
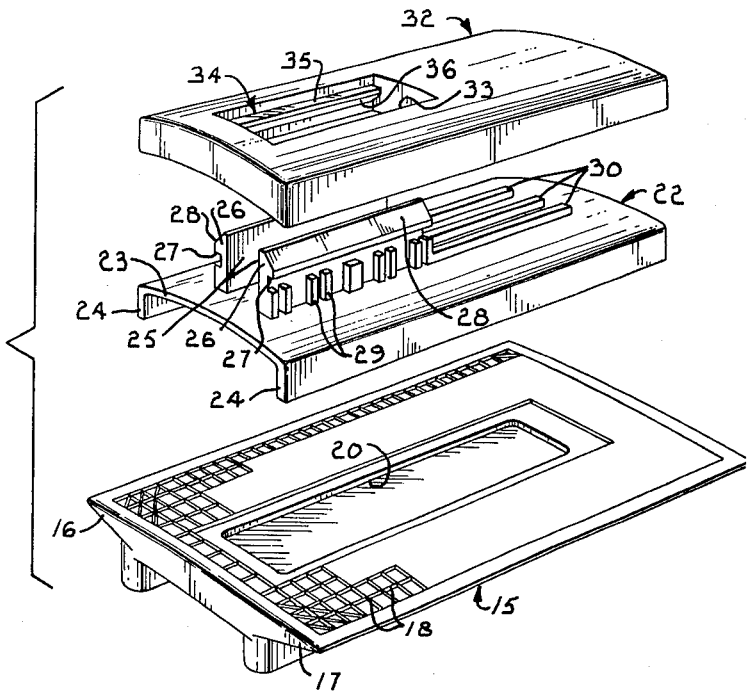
FIG. 1 is an exploded view illustrating the three components of a sliding gate constructed in accordance with a preferred embodiment of the invention.

Referring to the drawings in detail, reference numeral 10 designates a cylindrical irrigation pipe which is shown only fragmentarily. Irrigation systems typically incorporate pipes of approximately 6 to 12 inches in diameter which are connected end to end and which are provided with a plurality of outlet openings at spaced locations along their lengths. In accordance with the present invention, the outlet openings are preferably formed in the side of pipe 10 and are generally in the shape of a keyhole, one of the openings being indicated by numeral 11. The keyhole opening 11 includes a relatively large circular portion 12 and a narrower slot portion 13 which extends away from portion 12 in the direction of the pipe axis.

The gate assembly includes a sliding boot 15 which is positioned within pipe 10 against the interior surface thereof at a location adjacent to opening 11. Boot 15 is constructed of a deformable, resilient material such as rubber which is able to seal against the pipe. The configuration of boot 15 and its dimensions relative to opening 11 are substantially the same as those described in U.S. Pat. No. 2,918,251. However, the side flanges 16 and 17 of boot 15 are tapered in a more pronounced manner than the corresponding flanges of the boot member shown in the Epp patent. In addition, the surface of boot 15 which confronts the pipe is provided with a plurality of small ridges 18 which are arranged in a mesh-like pattern to increase the sealing effect of the boot.

Figure 3:
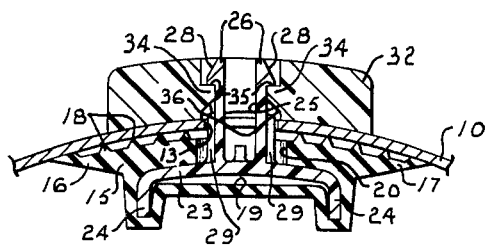
FIG. 3 is a fragmentary sectional view on an enlarged scale taken generally along line 3—3 of FIG. 2 in the direction of the arrows.
Figure 4:
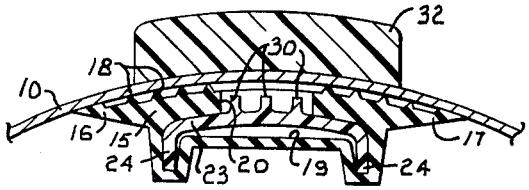
FIG. 4 is a fragmentary sectional view on an enlarged scale taken generally along line 4—4 of FIG. 2 in the direction of the arrows.

With particular reference to FIGS. 3 and 4, a cavity or channel 19 is formed interiorly of boot 15. Channel 19 extends longitudinally within the boot and is in the general shape of an inverted U. A rectangular opening 20 of lesser width than channel 19 extends outwardly from the channel through the upper surface of the boot. Opening 20 is located substantially centrally of the boot and is slightly wider and considerably longer than the slot portion 13 of the pipe opening 11.

A carrier member 22 for the boot is fitted closely within channel 19. The carrier member is preferably molded of a strong plastic having good resistance to corrosion. The body or base portion of carrier member 22 comprises a slightly arched central web 23 and opposite legs 24 which extend downwardly from the opposite side edges of the web. The overall configuration is thus in the shape of an inverted U to substantially conform to the shape of channel 19 such that relative movement between the carrier member and boot is prevented.

Figure 2:
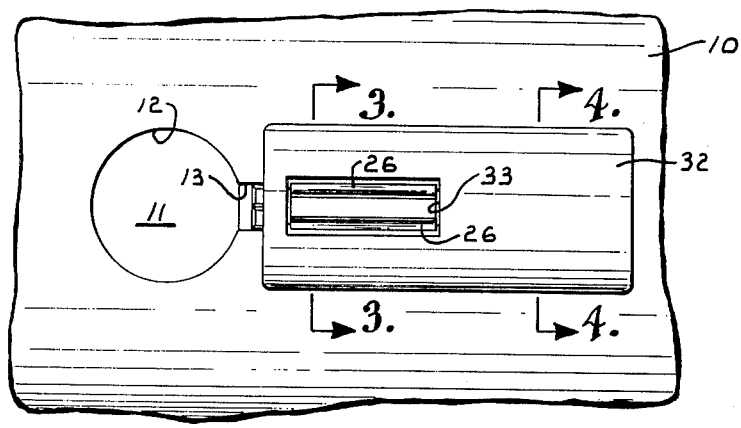
FIG. 2 is a side elevational view showing the gate installed on a fragmentary portion of an irrigation pipe, with the gate illustrated in its fully open position to expose the large circular portion of a keyhole shaped outlet opening formed in the side of the pipe.

The upper surface of web 23 is provided with a pair of upstanding lugs 25 which project outwardly through opening 20 of the boot and through keyhole opening 11 of the pipe. Lugs 25 are parallel to one another and extend longitudinally somewhat less than half the length of carrier member 22 on opposite sides of its center line. The lugs are set back from the leading edge of the carrier member so that their flat forward ends bear against the forward edge of opening 20. Movement of the gate assembly to the right as viewed in FIG. 2 is limited by engagement between the back ends of lugs 25 and the back edge of slot portion 13. As previously noted, lugs 25 are preferably plastic and therefore exhibit resilient characteristics. Accordingly, the upper ends of the lugs can be forced toward one another, although their resiliency urges them to spring back into a position parallel to one another.

The outer edge of each lug 25 has an enlarged overhanging head 26 formed thereon. The heads 26 project away from the lugs in opposite directions and extend the entire length of the lugs. A flat shoulder 27 (FIG. 1) is presented on the underside of each head 26, the shoulders being perpendicular to the lugs and extending outwardly therefrom. The outer surface of each head 26 extends perpendicularly to shoulder 27 for a short distance and then slants inwardly toward the wall for a substantial distance to present an inclined surface 28. Each head 26 terminates in a flat top edge.

A plurality of short ribs 29 extend upwardly from web 23 along the outer surface of each lug 25. Ribs 29 are of approximately half the height of lugs 25 and thus terminate well below shoulders 27. As best illustrated in FIG. 3, the ribs 29 associated with the opposite lugs 25 extend into slot portion 13 of the pipe opening and cooperate with the side edges thereof to prevent the carrier member and boot from rotating relative to pipe 10. The gate assembly is thereby confined to sliding movement in a direction parallel with the pipe axis.

Three parallel ribs 30 of lesser height than ribs 29 extend longitudinally along the upper surface of web 23. The two outer ribs 30 extend rearwardly from the end ribs 29, while the intermediate rib 30 is spaces centrally between the two outer ribs. Ribs 30 are set forwardly from the back end of carrier member 22 so that they bear against the back edge of the boot opening 20.

A slide member 32 is installed on the exterior surface of pipe 10 and is connected to the boot and carrier member assembly to effect movement of the entire gate. The slide member is preferably molded from a corrosion resistent plastic. Slide 32 is of generally rectangular configuration, although its underside is curved somewhat in concave fashion in order to conform to the curvature of pipe 10. The slide member is provided with a rectangular opening 33 which is set back from the leading edge of the slide. Opening 33 is oriented longitudinally of the slide and is centered on its longitudinal axis. The length of opening 33 is substantially equal to that of lugs 25, while the opening is wider than the distance between the lugs.

A pair of ledges 34 are formed integrally on the opposite side walls of opening 33. Ledges 34 project inwardly toward one another and extend the entire length of the opening. A flat shoulder 35 is formed on the upper surface of each ledge. Shoulders 35 are perpendicular to the side walls of opening 33 and are located considerably below the upper surface of the slide member. The inner surface of each ledge 34 extends downwardly at a right angle from shoulder 35 and then slants toward the side wall of opening 33 to present an inclined surface 36 which is angled similarly to the inclined surface 28 on head 26.

To install the gate on pipe 10, the assembled boot 15 and carrier member 22 are inserted through the keyhole opening 11. After the boot and its carrier have been positioned so that the lugs 25 extend outwardly through slot portion 13, the slide member 32 is applied. To accomplish this, the slide is pressed toward the pipe with opening 33 fitted over lugs 25. As the inclined surfaces 28 and 36 on heads 26 and ledges 34 bear against one another, the resulting camming action forces the upper portions of the lugs inwardly toward one another. When the slide has been positioned against pipe 10, the shoulders 27 and 35 are moved into alignment with one another. The resiliency of lugs 25 then springs the lugs away from one another, and shoulders 27 are snapped outwardly into tight overlying engagement with shoulders 36. This is the position shown in FIG. 3. The connection between shoulders 27 and 35 holds the gate assembly together and also draws the flexible boot tightly against the interior surface of pipe 10.

Movement of the gate assembly parallel with the axis of pipe 10 controls the effective size of opening 11 and thus regulates the water flow therethrough. The size of opening 11 may be varied as desired by setting the gate anywhere between the fully opened position shown in FIG. 2 and the fully closed position wherein the gate is shifted completely to the left. At the closed position, boot 15 seals against pipe 10 around the entire periphery of opening 11 to prevent any water from discharging through the opening. Since lugs 25 extend longitudinally for a substantial portion of the length of the boot, the connection between shoulders 27 and 35 maintains both ends of the boot tightly against pipe 10, even if high water pressure conditions exist. The location of the lugs 25 on opposite sides of the boot center line assures that the side flanges 16 and 17 of the boot are retained against the pipe.

Heads 26 are located entirely within opening 33 so that the slide member protects them against exposure to a substantial extent. At the same time, the heads are readily accessible to permit disassembly of the gate, as when it is desired to replace boot 15. The inclined surfaces 28 on the heads allow lugs 25 to be pinched toward one another to disengage shoulders 27 from shoulders 35 and permit slide 32 to be removed.

From the foregoing it will be seen that this invention is now well adapted to attain all the ends and object hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A gate assembly for controlling fluid flow through an opening formed in the wall of an irrigation pipe, said gate assembly comprising:
   a flexible closure member positioned adjacent said opening against the interior surface of said pipe for sliding movement between an open position and a closed position to respectively permit and prevent flow through said opening;
   a slide member overlying said opening on the exterior of said pipe, said slide member including a pair of abutment surfaces spaced apart from one another and oriented to face generally away from said closure member; and
   a carrier member connected to said closure member to effect movement of the latter, said carrier member including a pair of resilient lugs spaced apart from one another with the resiliency of said lugs permitting them to be displaced laterally relative to one another, said lugs extending outwardly through said opening and presenting shoulders oriented to face generally toward said closure member, said shoulders overlying the respective abutment surfaces in engagement therewith to connect said closure, carrier and slide members together for movement in unison.

2. The invention set forth in claim 1, including a cavity formed through said slide member in which said abutment surfaces are located and in which the respective shoulders and abutment surfaces engage one another, said cavity being accessible to permit said shoulders to be disengaged from said abutment surfaces.

3. The invention set forth in claim 1, including cooperating camming surfaces formed adjacent said shoulders and abutment surfaces to effect displacement of said lugs and thereby facilitate the positioning of said shoulders and abutment surfaces against one another.

4. The invention set forth in claim 1, wherein said lugs comprise elongate members extending longitudinally along said carrier member and spaced on opposite sides of the longitudinal axis thereof, said shoulders and abutment surfaces being of substantially the same length as said lugs.

5. The invention set forth in claim 4, wherein said opening includes a slot portion and an enlarged end portion of greater width than the slot portion, said lugs being spaced apart a distance less than the width of said slot portion.

6. The invention set forth in claim 1, wherein said shoulders are presented on head portions of the respective lugs, said head portions projecting away from said lugs in substantially opposite directions.

* * * * *